United States Patent [19]

Mizuho et al.

[11] Patent Number: 4,938,167
[45] Date of Patent: Jul. 3, 1990

[54] SELF-PROPELLED VEHICLE FOR USE IN PIPES

[75] Inventors: Koichi Mizuho, Tondabayashi; Nobuaki Kaitatsu, Ikeda, both of Japan

[73] Assignees: Kubota Ltd., Osaka; Shin-Toyo Engineering Co., Ltd., Kobe, both of Japan

[21] Appl. No.: 301,100

[22] Filed: Jan. 25, 1989

[30] Foreign Application Priority Data

Jan. 26, 1988 [JP] Japan .................................. 63-15276

[51] Int. Cl.⁵ .......................... B05B 13/06; B05C 7/08
[52] U.S. Cl. .................... 118/713; 15/104.14;
15/104.31; 118/306; 118/315; 118/317;
118/323; 118/DIG. 10
[58] Field of Search ............... 118/306, 315, 317, 323,
118/DIG. 10; 15/104.09, 104.13, 104.14,
104.31

[56] References Cited

U.S. PATENT DOCUMENTS

| | | | |
|---|---|---|---|
| 2,278,026 | 3/1942 | Smith | 15/104.31 |
| 2,742,259 | 4/1956 | Boucher | 15/104.12 |
| 3,056,155 | 10/1962 | Harmes | 119/DIG. 10 |
| 3,135,629 | 6/1964 | McLean | 118/DIG. 10 |
| 4,092,950 | 6/1978 | Hart | 118/306 |
| 4,112,850 | 9/1978 | Sigel-Gfeller | 118/DIG. 10 |
| 4,178,875 | 12/1979 | Moschetti | 118/306 |
| 4,418,437 | 12/1983 | French | 15/104.09 |
| 4,475,260 | 10/1984 | Beck | 15/104.31 |
| 4,782,786 | 11/1988 | Himmler | 118/DIG. 10 |

FOREIGN PATENT DOCUMENTS

| | | |
|---|---|---|
| 0212456A2 | 8/1986 | European Pat. Off. . |
| 564464 | 4/1957 | Italy ...................................... 118/306 |
| 1435004 | 5/1973 | United Kingdom . |
| 1502829 | 6/1975 | United Kingdom . |
| 1528775 | 10/1975 | United Kingdom . |
| 2150050A | 11/1983 | United Kingdom . |
| 2150050 | 6/1985 | United Kingdom ................ 118/306 |

Primary Examiner—James C. Housel
Attorney, Agent, or Firm—Armstrong, Nikaido, Marmelstein, Kubovcik & Murray

[57] ABSTRACT

A self-propelled vehicle for use in performing work inside pipes of piping systems, for example, for cleaning or coating the inner surface of the pipe includes at least three traveling assemblies connected to the body of the vehicle by parallel link assemblies. The traveling assemblies are travaeled along the pipe inner surface to be worked on by the operation of a drive unit and transmissions while being pressed against the pipe inner surface by a collapsing assembly. During travel, a liquid can be sprayed onto the pipe inner surface by a nozzle which is rotated.

10 Claims, 4 Drawing Sheets

SELF-PROPELLED VEHICLE FOR USE IN PIPES

TECHNICAL FIELD

The present invention relates to self-propelled vehicles for use in pipes of piping systems for performing work, for example, for cleaning or coating the inner surface of the pipe.

BACKGROUND OF THE INVENTION

From the viewpoint of safety, sanitation and work efficiency, vehicles are used within pipes of various piping systems such as oil cargo pipes for oil tankers, and water supply pipes, sewers and gas pipes under the ground or above the ground for performing work, for example, for cleaning or coating the inner surface of the pipe. For instance, pipes are cleaned by placing into the pipe a vehicle carrying a cleaning spray device and moving the vehicle axially of the pipe. Pipes are coated similarly using a vehicle having a coating spray device mounted thereon.

However, since conventional vehicles are not of the self-propelled type, the vehicle must be moved by pulling a rope attached to the vehicle. Accordingly, when work is to be performed within a pipe using the conventional vehicle, a worker must enter the pipe first to extend and deliver the rope to another worker outside the pipe. With piping systems, the interior of which is not accessible, it is therefore necessary to remove the unit pipe to be worked on from the system at flange joints or the like, perform work in the pipe using the vehicle outside the piping system and connect the pipe to the system again after the completion of the work. The vehicle therefore has the drawback of necessitating a very cumbersome procedure on a large scale.

Furthermore, conventional vehicles are designed specifically for particular work. Cleaning vehicles are used only for cleaning, while coating vehicles are adapted to conduct a coating operation only. Accordingly, when different kinds of work are to be performed for one pipe, for example, when the pipe is to be cleaned and then coated, different vehicles need to be used for the different kinds of work. The coating operation to be conducted after the cleaning operation requires removal of the cleaning vehicle from the interior of the pipe, placement of the coating vehicle into the pipe and provision of the pulling rope, hence the problem of necessitating much time and labor.

SUMMARY OF THE INvENTION

An object of the present invention is to provide a self-propelled vehicle for performing work inside pipes without the need for the worker to enter the pipe before the work.

Another object of the invention is to provide a self-propelled vehicle which utilizes compressed air as its drive source so as to be usable for performing different kinds of work within pipes.

The self-propelled vehicle of the invention comprises a vehicle body, at least three parallel link assemblies arranged at approximately equal angular spacings about the axis of the vehicle body and each comprising first and second links pivoted at their base ends to the vehicle body, a traveling assembly connected to the free ends of the links of each parallel link assembly and movable along the inner wall surface of the pipe to be worked on, a collapsing assembly connected to the parallel link assembly for moving the traveling assembly toward or away from the pipe inner surface, a drive unit disposed within the vehicle body for driving the traveling assembly, a transmission for transmitting the drive force of the drive unit to the traveling assembly, and a rotary nozzle assembly removably attached to the front portion of the vehicle body for causing a nozzle to apply a liquid to the pipe inner surface while rotating the nozzle.

BRIEF DESCRIPTION OF THE DRAWINGS

FIG. 3 is a diagram showing traveling assemblies as moved toward or away from the inner surface of the pipe to be worked on;

DETAILED DESCRIPTION OF EMBODIMENTS

The self-propelled vehicle of the invention for use in pipes will be described with reference to the accompanying drawings.

Figure 1:
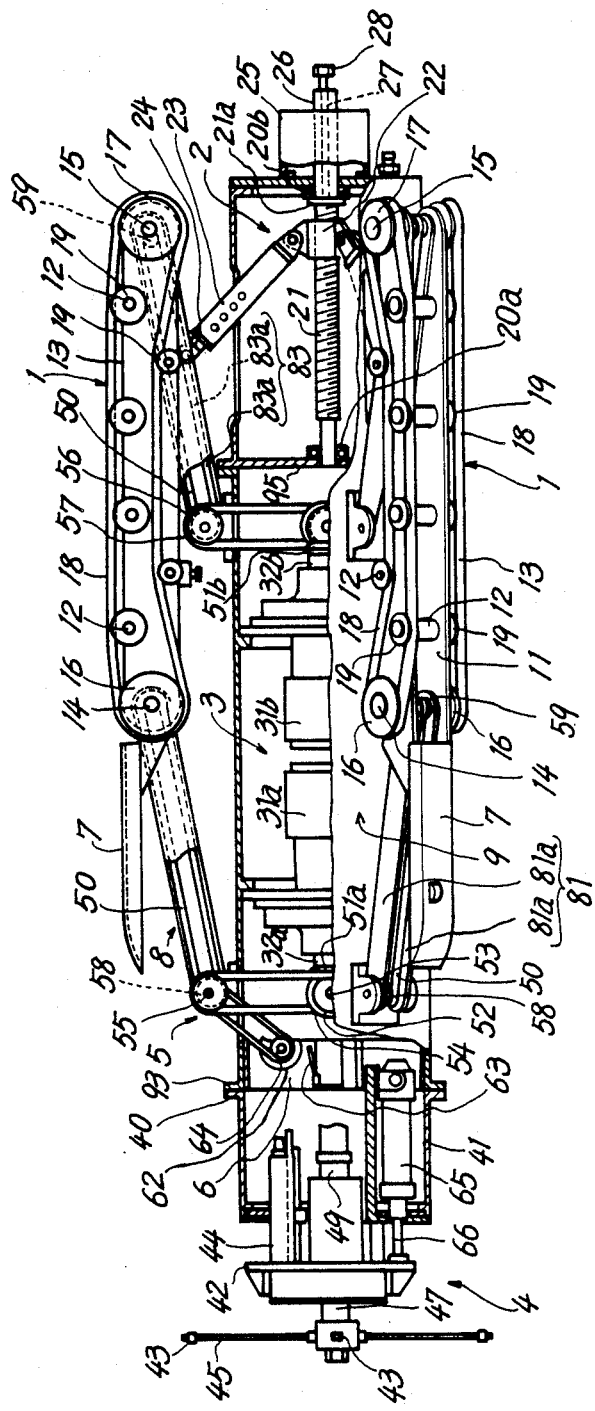
FIG. 1 is a view partly broken away and showing a self-propelled vehicle embodying the invention.
Figure 2A:
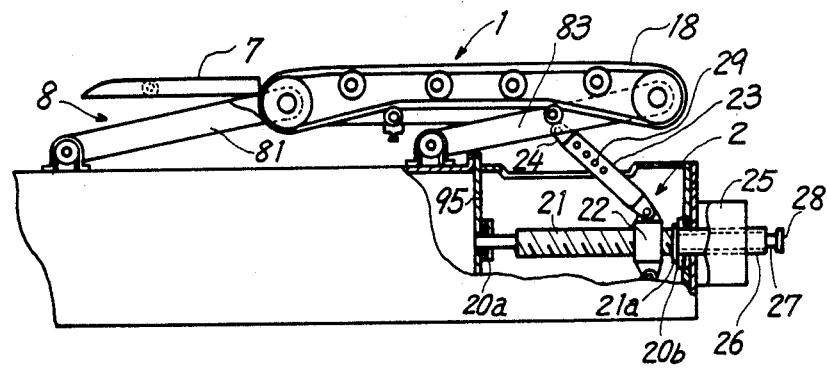
FIG. 2A is a view showing a traveling assembly as moved toward the body of the vehicle by a collapsing assembly.
Figure 2B:
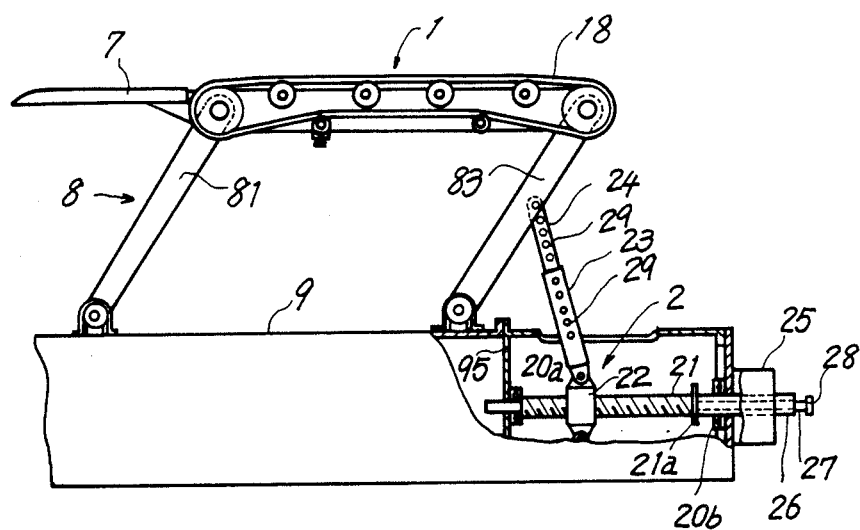
FIG. 2B is a view showing the same as moved away from the vehicle body by the collapsing assembly.
Figure 3:
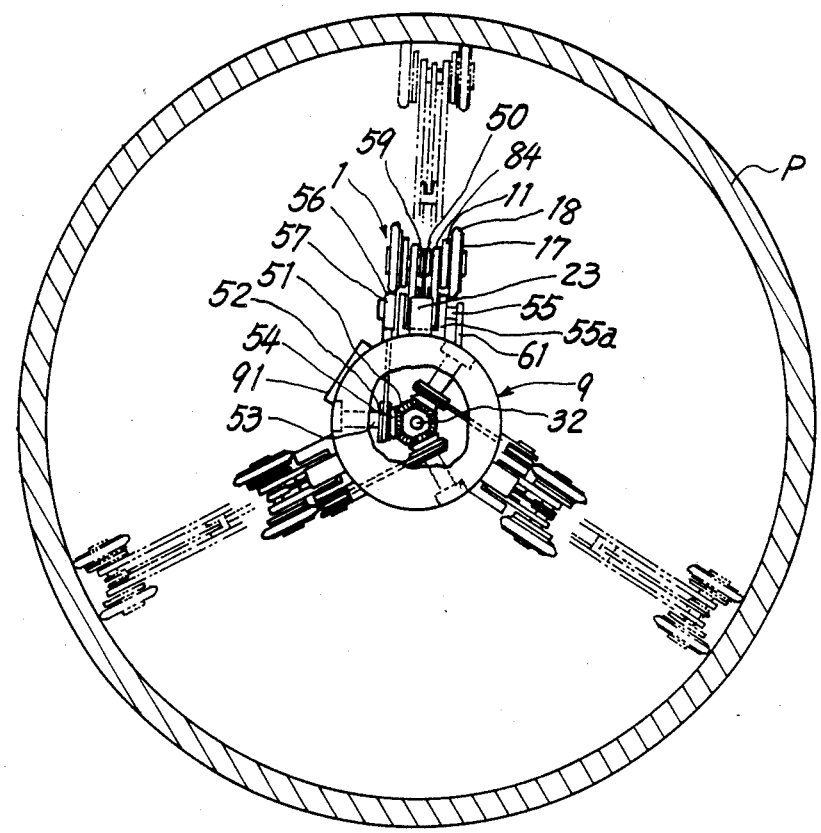

FIGS. 1 to 3 show an embodiment comprising three traveling assemblies 1. The traveling assemblies 1 are connected to a vehicle body 9 by parallel link assemblies 8, 8, 8 and traveled along the inner surface of the pipe to be worked on by the operation of a drive unit 3 and transmissions 5, 5, 5 while being pressed against the inner surface of the pipe P by a collapsing assembly 2. A rotary nozzle assembly 4 has a rotary shaft 47 and a nozzle 43 positioned generally perpendicular to the shaft 47. During travel, the nozzle 43 rotates. When required, four or more traveling assemblies 1 can be provided.

The vehicle of the invention employs compressed air as its power source so as to be usable for cleaning or coating selectively. The reason is that since volatile solvents are used for coating, the use of electricity as the power source involves an explosion hazard and is therefore undesirable.

The parallel link assemblies 8 serve to connect the traveling assemblies 1 to the vehicle body 9. With reference to FIGS. 1 and 2, each link assembly 8 comprises a pair of first link 81 and second link 83 having the same length. The first link 81 comprises opposed first link bars 81a, 81a spaced apart by a predetermined distance and has a base end rotatably attached to a rotary shaft 55 of the transmission 5 mounted on the vehicle body 9. The other end of the link 81 is rotatably attached to a front rotary shaft 14 of the traveling assembly 1. The second link 83 comprises opposed first link bars 83a, 83a spaced apart by a predetermined distance and has a base end rotatably attached to another rotary shaft 55 of the transmission 5. The other end of the link 83 is rotatably attached to a rear rotary shaft 15 of the traveling assembly 1. The three link assemblies 8 are arranged at an angular spacing of about 120 degrees about the axis of the vehicle body 9. The force from the collapsing assembly 2 and the drive force of the drive unit 3 are transmitted to the traveling assemblies 1 through the link assemblies 8.

Each traveling assembly 1 travels along the inner wall surface of the pipe P to be worked on axially of the pipe to thereby move the vehicle. The assembly 1 comprises two opposed frame plates 11, 11 having approximately the same shape and connected together by a plurality of connecting pins 12, the front (first) and rear (second) rotary shafts 14, 15 fitted respectively in the front and rear portions of the frame plates, a pair of main pulleys 16, 16 rotatably mounted on the respective ends of the first rotary shaft 14, a pair of main pulleys 17, 17 rotatably mounted on the respective ends of the second rotary shaft 15, auxiliary pulleys 19, 19 rotatably mounted on the respective ends of the connecting pins, and belts 18, 18 endlessly reeved around the main pulleys and the auxiliary pulleys.

The collapsing assembly 2 is adapted to move the traveling assemblies 1 toward or away from the inner surface of the pipe to be worked on and to pneumatically press the assemblies 1 against the tube inner surface. The collapsing assembly 2 comprises an air cylinder 25 secured to the rear portion of the vehicle body 9, a screw rod 21 provided inside the vehicle body 9, an internally threaded block 22 screwed on the threaded portion of the screw rod, support frames 23 pivoted to the block 22, and support bars 24 connected to the respective traveling assemblies 1 and each inserted in the support frame 23, the bars 24 being fixedly positionable relative to the frames 23.

The air cylinder 25 has a piston rod 26 projectable into and retractable from the vehicle body 9. The piston rod 26 has a thrust bearing 20b fitted to its forward end.

The screw rod 21 is rotatably supported by the vehicle body 9 and is movable axially thereof by a specified distance. The screw rod 21 comprises a small diameter portion and a threaded large diameter portion. The threaded portion has at its rear end a flange 21a which is adapted to bear against the thrust bearing 20b face-to-face. An extension rod 27 implanted in the rear end of the thread portion extends through the piston rod 26 of the air cylinder 25 and is formed with a head 28 at its outer end. The screw rod 21 is rotated by the head 28. The small diameter portion of the screw rod 21 is fitted in a thrust bearing 20a mounted on a partition wall 95 of the vehicle body 9. The partition wall 95 has a hole for the screw rod small diameter portion to pass through.

The support bars 24 are slidably fitted in the support frames 23. The base portion of each frame 23 is pivoted to the block 22, while the outer end of each support bar 24 is pivoted approximately to the midportion of the second link 83 of each link assembly 8. Each frame 23 and bar 24 are formed with a plurality of holes 29 arranged at a specified spacing. By inserting a positioning pin (not shown) through the frame and the bar at the selected corresponding holes, the length of projection of the support bar 24 from the frame 23 can be determined.

When the traveling assemblies 1 are in a collapsed position, no air is applied to the air cylinder 25, so that the flange 21a on the screw rod 21 bears against and is supported by the thrust bearing 20b as seen in FIG. 2A. When the traveling assemblies 1 are positioned away from the vehicle body 9, air is applied to the air cylinder, causing the stepped end face of the large diameter portion of the screw rod 21 to bear against the thrust bearing 20a and to be thereby supported as seen in FIG. 2B.

The collapsing assembly 2 is operated in the following manner. First, the angle of inclination of the first and second links 81, 83 of each traveling assembly 1 is so determined that a small clearance (e.g. about 25 mm) will be formed between the outer face of each assembly 1 and the pipe inner surface to be worked on. Next, each support bar 24 is drawn out and fixed to each support frame 23 with the positioning pin so that the links will be fixed approximately at the inclination angle. The piston rod 26 of the air cylinder 25 is then operated, thereby moving the screw rod 21 toward the front end of the vehicle body 9 (for example, by about 100 mm) and further varying the angle of inclination of each link assembly 8 connected to each support bar 24 to bring the outer running face of the traveling assembly 1 into the pipe inner surface. In this state, each assembly 1 is pressed against the pipe inner surface pneumatically. This pressure is further adjustable by rotating the screw rod 21 and moving the internally threaded block 22.

The drive unit 3 serves to move the traveling assemblies 1 axially of the pipe to be worked on. The drive unit 3 comprises two air motors 31a, 31b which are changeable in the direction of rotation of their output shaft and arranged back-to-back inside the vehicle body 9, with the output shaft made rotatable in directions opposite to each other. Thus, when the first air motor 31a rotates positively, the second air motor 31b rotates reversely, while when the first motor 31a rotates reversely, the second motor 31b rotates positively, with the result that the rotary shafts 14, 15 of each traveling assembly 1 rotate together in the same direction.

Each of the transmissions 5 is adapted to transmit the drive force of the drive unit 3 to each traveling assembly 1 through first belts 57 and second belts 50. The transmissions are coupled to the output shafts 32a, 32b of the respective air motors 31a, 31b.

With reference to FIGS. 1 and 3, at positions dividing the circumference of the vehicle body 9, which is in the form of a hollow cylinder, into three equal portions, three shafts 53, 53, 53 extend from the inner surface of the vehicle body 9 toward its axis. A pulley 54 and a bevel gear 52 are mounted on the forward end of each of these shafts 53. Each shaft 53 is in parallel to each aforementioned rotary shaft 55 which is each supported by suitable bracket means 55a on the outer side of the vehicle body 9. Each rotary shaft 55 has mounted thereon a pulley 56 positioned in the same plane as the plane of rotation of the pulley 54. Pulleys 58, 59 are mounted on each rotary shaft 55 and rotary shaft 14 of each traveling assembly 1, respectively. Each belt 57 is endlessly reeved around the pulleys 54 and 56. Each belt 50 is endlessly reeved around the pulleys 58 and 56. Bevel gears 51a, 51b are mounted on the respective output shafts 32a, 32b of the air motors 31a, 31b. The bevel gear 52 is in mesh with the bevel gear 51a or 51b. Consequently, the rotation of the air motor 31a is transmitted from the bevel gear 51a to each rotary shaft 53 via bevel gear 52, then to each rotary shaft 55 through each belt 57 and further to each front rotary shaft 14 of each traveling assembly 1 through each belt 50. Similarly, the rotation of the air motor 31b is transmitted to each rear rotary shaft 15 of each traveling assembly 1. When the first air motor 31a rotates positively, the second air motor 31b rotates reversely, and the two motors are arranged back to back, so that the rotary shafts 14 and 15 rotate in the same direction to advance each traveling assembly 1. Each assembly 1 retracts when the direction of rotation of the two air motors is changed.

Figure 4:
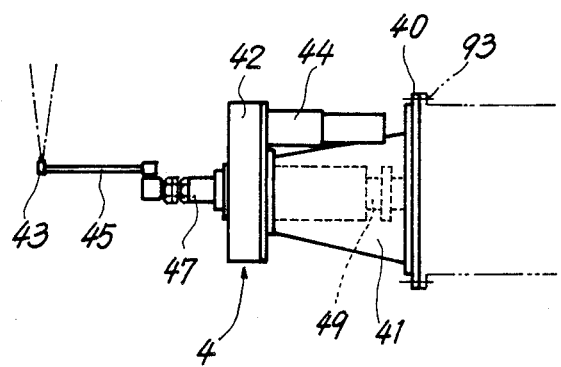
FIG. 4 is a view showing another embodiment of rotary nozzle assembly.

The rotary nozzle assembly 4 is adapted to clean or coat the pipe inner surface. With reference to FIG. 4, the nozzle assembly 4 includes a nozzle pipe mount 42 on a base 41, a nozzle pipe 45 projecting from the forward end of the forementioned rotary shaft 47 on the mount 42, and the aforementioned nozzle 43 attached to the forward end of the nozzle pipe 45 perpendicular to the nozzle pipe for spraying a liquid onto the pipe inner surface. An air motor 44 attached to the mount 42 is coupled to the rotary shaft 47 for drivingly rotating the nozzle pipe 45. The nozzle pipe 45 is connected to an unillustrate liquid source by a conduit member 49. The base 41 is provided at its bottom with a flange 40 which is removably attached to a flange 93 at the front end of the vehicle body 9 by fastening means such as bolts. This embodiment is suited chiefly to coating work.

To assure an improved cleaning effect when the vehicle is used for cleaning, it is desirable to use an increased number (at least two) of nozzle pipes. With reference to FIG. 1, four nozzle pipes 45 (one not shown) are arranged at an angular spacing of approximately 90 degrees about the rotary shaft 47 rotatably in a plane intersecting the shaft 47 perpendicular thereto.

FIG. 1 further shows a nozzle reciprocating assembly 6 for achieving a further improved cleaning effect. A nozzle pipe mount 42 is separable from the base 41 and reciprocatingly movable by the assembly 6 axially of the vehicle body 9, such that the nozzles 43 on the shaft 47 can be reciprocatingly movable forward and rearward axially of the pipe to be worked on while being revolved by the air motor 44.

The nozzle reciprocating assembly 6 has a rotary shaft 64 supported within the vehicle body 9 in parallel to the rotary shaft 55 of the transmission 5. A belt 61 is endlessly reeved around the rotary shafts 64 and 55. An air cylinder 65 fixed to the base 41 has a piston rod 66 with its forward end attached to the nozzle pipe mount 42 to move the mount 42 axially of the vehicle body. A cam 62 mounted on the rotary shaft 64 is rotatable by the drive force of the drive unit air motor 31a transmitted to the rotary shaft 64 through the belts 57, 61. When rotated, the cam comes into contact with a limit switch 63 on the base 41 to produce a signal, in response to which the piston rod 66 of the air cylinder 65 advances or retracts.

Figure 5:
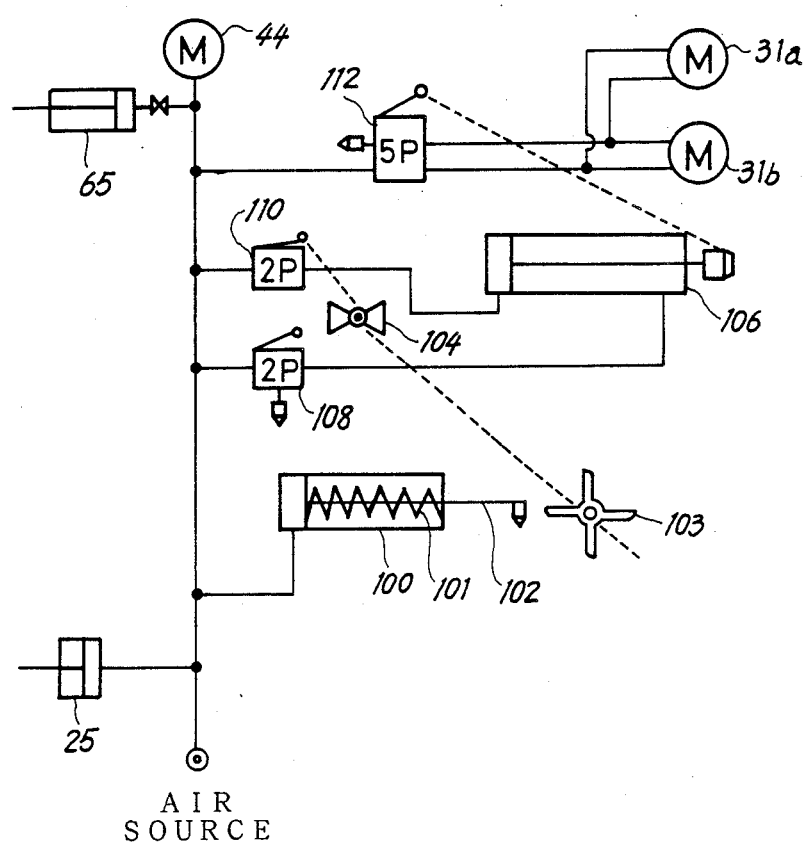
FIG. 5 is a circuit diagram showing an embodiment of pneumatic system for the vehicle of the invention.

FIG. 5 shows an embodiment of pneumatic circuit for the self-propelled vehicle of the present invention. Although the present embodiment is made entirely operable by a single air duct in view of the efficiency of work inside pipes, the motors and air cylinders are of course made operable or controllable individually by a plurality of air ducts.

FIG. 5 shows the elements which require the supply of air, the air cylinder 25 of the collapsing assembly 2, the air motors 31a, 31b of the drive unit 3, the air motor 44 of the rotary nozzle assembly 4, and the air cylinder 65 of the nozzle reciprocating assembly 6. Air is also supplied to an air cylinder 106 coupled to a five-port limit switch 112 and serving to change the direction of rotation of the air motors 31a, 31b, and to an air cylinder 100 for controlling the operation of the air cylinder 106. The air cylinder 100 has incorporated therein a compression spring 101 and a piston 102, which advances against the action of the spring when air is supplied to the cylinder to change over a cross cam 103. The air cylinder 106 has coupled thereto two-port switches 108 and 110 which are turned on or off by the rotation of a cam 104 coupled to the cross cam 103.

Each traveling assembly 1 is adapted to advance or retract selectively in the following manner. When air is supplied to the circuit to rotate the motor 31a forward and the motor 31b reversely, each traveling assembly 1 moves forward. When the supply of air is discontinued, the motors 31a, 31b stop, and the piston rod 102 of the air cylinder 100 is retracted by the action of the compression spring 101. When air is supplied subsequently, the piston rod 102 of the air cylinder 100 advances to rotate the cross cam 103 through 90 degrees. The rotation of the cross cam is delivered to the cam 104 to change over the limit switches 108, 110. Through the air cylinder 106, the limit switch 112 is further changed over, whereby the direction of rotation of the motors 31a, 31b is changed. The motor 31a therefore rotates reversely and the motor 31b forward to retract each traveling assembly.

When performing work inside a pipe, the vehicle is first placed into the pipe, the screw rod 21 and the support bars 24 are moved, and the air cylinder 25 is operated, whereby the outer running faces of the traveling assemblies are pressed against the pipe inner surface as seen in FIG. 3 to fixedly position the vehicle body 9 in the interior space of the pipe. Next, the air motors 31a, 31b are driven to advance or retract the vehicle. During the travel of the vehicle, the nozzle pipes 45 of the rotary nozzle assembly 4 are rotated to cause the nozzles 43 on the forward ends of the pipes 45 to spray a liquid onto the pipe inner surface. When the nozzle reciprocating assembly 6 is operated at the same time, the liquid can be applied repeatedly to the pipe inner surface by the forward-rearward movement of the nozzles.

FIG. 3 shows a mount 91 attached to the outer periphery of the vehicle body 9. When a television camera, for example, is attached to the mount 91, the desired work can be performed while observing the interior of the pipe.

If the pipe to be worked on has a branch pipe, the opening portion of the branch pipe is likely to impede the travel of the vehicle. Accordingly, each of the traveling assemblies 1, when provided with an elongated slide assisting plate 7, can be driven smoothly.

The vehicle of the invention is adapted to perform work, such as cleaning or coating, inside pipes while running within the pipe by itself. Accordingly, there is no need to move the vehicle with a pulling rope as conventionally practiced or to extend the rope through the pipe for preparation. Moreover, even if the worker can not enter the pipe, the desired work can be performed inside the pipe without removing the pipe from the piping system.

The traveling assemblies are movable by the collapsing assembly radially of the pipe to be worked on toward or away from the pipe inner surface, so that the vehicle is usable for work within pipes having varying diameters.

Each traveling assembly is pressed at its outer running face against the pipe inner surface pneumatically and therefore has a cushioning action. Accordingly at a location where the pipe has a reduced inside diameter owing to a deposit or the like, the screw rod 21 moves rearward against the air pressure of the air cylinder 25 to diametrically diminish the arrangement of the traveling assemblies, permitting the vehicle to travel with very high stability.

The rotary nozzle assembly is removably provided, so that the desired work such as coating or cleaning can be performed selectively merely by changing the assembly.

Since air is used as the drive source for running the vehicle, work can be done free of any explosion hazard with high safety even if volatile solvents are used.

What is claimed is:

1. A self-propelled vehicle for use in performing work in an interior of a pipe of a piping system, said self-propelled vehicle comprising:
    a vehicle body;
    at least three parallel link assemblies arranged at approximately equal angular spacings about a central axis of the vehicle body and each comprising first and second links having opposed base and free ends and being pivoted at the base ends to the vehicle body;
    at least three traveling assemblies connected to the respective link assemblies at the free ends of the first and second links and movable along an inner surface of the pipe to be worked on;
    a collapsing assembly, connected to the link assemblies, moving the traveling assemblies toward or away from the pipe inner surface wherein the collapsing assembly comprises,
        a screw rod provided in the vehicle body rotatably and movable by a specified distance axially thereof, the screw rod having an extension rod implanted in a rear end thereof,
        an internally threaded block screwed on the threaded portion of the screw rod,
        support frames pivoted at base portions thereof to the block,
        support bars, each slidably inserted in each support frame and fixedly positionable relative thereto, each support bar having an outer end pivoted approximately to a midportion of the second link of a respective one of the at least three parallel link assemblies,
        an air cylinder having a portion secured to a rear portion of the vehicle body, and
        a piston rod retractable into a body portion of the air cylinder and projectable therefrom into the vehicle body, a length of projection of each support bar from each support frame being adjustable stepwise, the extension rod on the screw rod extending through the piston rod of the air cylinder and projecting out from the piston rod;
    a drive unit, disposed within the vehicle body, providing a drive force for driving the traveling assemblies;
    at least three transmissions transmitting the drive force to the traveling assemblies; and
    a rotary nozzle assembly, removably attached to a front portion of the vehicle body, causing a nozzle to apply a liquid to the pipe inner surface while rotating the nozzle.

2. A self-propelled vehicle as defined in claim 1 further comprising a nozzle reciprocating assembly reciprocatingly moving the nozzle axially of the vehicle body.

3. A self-propelled vehicle as defined in claim 1 wherein each of the traveling assemblies comprises two opposed frame plates connected together by connecting pins, first and second rotary shafts fitted on front and rear portions of the frame plates, a pair of first main pulleys rotatably mounted on respective ends of the first rotary shaft, a pair of second main pulleys rotatably mounted on respective ends of the second rotary shaft, a pair of auxiliary pulleys rotatably mounted on respective ends of each connecting pin, and first and second belts endlessly reeved around the main pulleys and the auxiliary pulleys.

4. A self-propelled vehicle as defined in claim 1 wherein the drive unit comprises two air motors arranged back-to-back and rotatable in directions opposite to each other.

5. A self-propelled vehicle as defined in claim 3 wherein each of the transmissions comprises a first rotatable shaft supported at one end by the vehicle body and extending from an inner surface of the vehicle body toward said central axis, a pulley mounted on the first rotatable shaft, a bevel gear mounted on the other end of the first rotatable shaft, a second rotatable shaft supported on an outer side of the vehicle body and disposed in parallel to the first rotatable shaft, a pulley mounted on the second rotatable shaft, a first belt endlessly reeved around the first and second rotatable shafts, and a second belt endlessly reeved around the second rotatable shaft and the first or second rotary shaft of the traveling assembly.

6. A self-propelled vehicle as defined in claim 1 wherein the rotary nozzle assembly comprises a base attached to the vehicle body, a nozzle pipe mount attached to the base, a rotary shaft supported at one end by the mount and projecting in the same direction as the central axis of the vehicle body, a nozzle pipe projecting from a forward end of the rotary shaft, said nozzle attached to a forward end of the nozzle pipe and disposed perpendicular to the nozzle pipe, and an air cylinder fixed to the mount and coupled to the rotary shaft.

7. A self-propelled vehicle as defined in claim 1 wherein the rotary nozzle assembly comprises a base attached to the vehicle body, a nozzle pipe mount attached to the base, a rotary shaft supported at one end by the mount and projecting in the same direction as the central axis of the vehicle body, at least two pipes attached to a forward end of the rotary shaft and arranged at approximately equal angular spacings about the shaft in a plane intersecting the shaft perpendicular thereto, a nozzle attached to an outer end of each nozzle pipe coaxially therewith, and an air cylinder fixed to the mount and coupled to the rotary shaft.

8. A self-propelled vehicle as defined in claim 7 which further includes a nozzle reciprocating assembly comprising a rotatable shaft supported on the vehicle body in parallel to a second rotary shaft of at least one of the transmissions, a cam mounted on the rotatable shaft, a belt reeved around the rotatable shaft and the second rotary shaft of the transmission, a limit switch attached to the base for contact with the cam, and an air cylinder having a body portion fixed to the base and a piston rod fixed at a forward end thereof to the nozzle pipe mount, the mount being separably attached to the base and reciprocatingly movable relative to the base by the operation of the transmission.

9. A self-propelled vehicle as defined in claim 1 wherein a television camera is mounted on an outer periphery of the vehicle body for observing the interior of the pipe to be worked on.

10. A self-propelled vehicle as defined in claim 1 wherein an elongated slide assisting plate is attached to a front portion of each traveling assembly.

* * * * *